Patented Jan. 9, 1940

2,186,116

UNITED STATES PATENT OFFICE 2,186,116

WELDING ALLOY

Arthur R. Lytle, Niagara Falls, N. Y., assignor to Oxweld Acetylene Company, a corporation of West Virginia No Drawing. Application September 30, 1938, Serial No. 232,531

2 Claims. (Cl. 75—158)

This invention relates to alloys and more specifically to alloy compositions which are useful as bearing surfaces and as welding rods, or filler material in other shapes, for forming bearing surfaces.

In my prior Patents 2,040,053 and 2,040,054, granted May 5, 1936, I have disclosed alloys of the lead-bronze type suitable for such uses. The compositions herein disclosed and claimed are improvements over those set forth in such prior patents.

In the oxy-acetylene welding of copper bearing alloys of the lead-containing bronze type, it is necessary to employ a strongly oxidizing flame, and to perform the welding operation slowly and carefully to ensure weld metal substantially free from porosity and other defects. There is a demand for a welding rod which will permit the deposition by oxy-acetylene methods of lead-containing bronze bearing metal at a relatively high deposition rate, for example, at the rate of 50 to 60 pounds of weld metal per hour. Such a welding rate is difficult to attain. It requires the maintenance of a large and deep puddle of weld metal, and since an oxidizing flame must be used, the molten metal is subjected to severe oxidation. As a result of such oxidation a viscous refractory slag is formed on the surface and within the body of the welding puddle. This slag, which can not be fluxed by the usual fluxing agents, greatly hampers the progress of the weld and leads to the production of defective weld metal. By modifying the compositions in the manner described in my afore-mentioned patents a definite improvement is obtained, especially in the flowing qualities of the metal and the slag; but the welding must still be done slowly and with great care.

It is an object of the present invention to improve the welding qualities of lead bronze so that the bronze can be rapidly deposited during welding and a relatively large and deep puddle employed. Another object of the invention is to provide lead-containing bearing bronzes which, when deposited by oxy-acetylene welding methods, form slags sufficiently fluid to rise rapidly to the surface of the welding puddle.

The above objects are attained in the present invention by the application of my discovery that by increasing the zinc content of the lead-containing bearing bronzes described in the above-mentioned patents, and by modifying the limits of the percentages of other ingredients, there results a marked improvement in the welding characteristics of such bronzes.

Alloys having compositions within approximately the following limits are included within the invention:

| | | Preferred range |
|---|---|---|
| Per cent lead | 8 to 18 | 12 to 15 |
| Per cent tin | 5 to 12 | 8 to 10 |
| Per cent zinc | 8 to 15 | 10 to 15 |
| Per cent silicon | 0.05 to 0.5 | 0.08 to 0.2 |
| Per cent copper | Remainder | Remainder |

In addition to the ingredients specified above, small amounts of other materials may be added without departing from the invention. For instance, nickel or alkali metal or both may be added to aid in emulsifying the lead.

Oxy-acetylene welds can be made with the filler material of the invention at a rate about ten times that formerly considered feasible without detrimentally affecting the quality of the weld metal. The metal so deposited is of uniform composition and substantially free from porosity, slag or oxide inclusions and other defects. Despite the use of a strongly oxidizing flame there is no detrimental effect on the type of slag produced during such welding. The slag is completely fusible, floats readily on the surface of the puddle and responds to the fluxing action of a normal fluxing material.

A few alloy compositions typical of those which have been successfully made and used in accordance with the principles of this invention are as follows:

| Copper | Lead | Tin | Zinc | Silicon |
|---|---|---|---|---|
| Percent | Percent | Percent | Percent | Percent |
| 72.5 | 7.9 | 8.9 | 11.1 | 0.10 |
| 70.0 | 8.0 | 8.9 | 10.6 | 0.49 |
| 75.4 | 8.0 | 5.8 | 10.7 | 0.11 |
| 72.0 | 8.4 | 8.9 | 10.4 | 0.33 |
| 66.9 | 12.9 | 9.4 | 10.5 | 0.32 |
| 63.0 | 15.0 | 12.0 | 10.0 | 0.30 |
| 64.0 | 12.0 | 9.0 | 15.0 | 0.30 |

While I have disclosed several specific embodiments of my invention, it is evident that such embodiments are by way of example, and may be modified within the scope of the invention as defined in the appended claims.

I claim:

1. Filler material for welding comprising lead 8% to 18%; tin 5% to 12%; zinc 8% to 15%; silicon 0.05% to 0.5% and the remainder substantially all copper.

2. Alloy welding rod comprising lead about 12% to 15%; tin about 8% to 10%; zinc about 10% to 15%; silicon about 0.08% to 0.2%; and the remainder substantially all copper.

ARTHUR R. LYTLE.